W. M. MITCHELL.
RAIL ANCHOR.
APPLICATION FILED DEC. 27, 1915.

1,184,477.

Patented May 23, 1916.
6 SHEETS—SHEET 1.

Witnesses:

Inventor.
Wm. M. Mitchell

W. M. MITCHELL.
RAIL ANCHOR.
APPLICATION FILED DEC. 27, 1915.

1,184,477.

Patented May 23, 1916.
6 SHEETS—SHEET 2.

W. M. MITCHELL.
RAIL ANCHOR.
APPLICATION FILED DEC. 27, 1915.

1,184,477.

Patented May 23, 1916.
6 SHEETS—SHEET 3.

Witnesses:

Inventor:
Wm. M. Mitchell

W. M. MITCHELL.
RAIL ANCHOR.
APPLICATION FILED DEC. 27, 1915.

1,184,477.

Patented May 23, 1916.
6 SHEETS—SHEET 4.

W. M. MITCHELL.
RAIL ANCHOR.
APPLICATION FILED DEC. 27, 1915.

1,184,477.

Patented May 23, 1916.
6 SHEETS—SHEET 5.

Witnesses:
Inventor:
Wm. M. Mitchell

UNITED STATES PATENT OFFICE.

WILLIAM M. MITCHELL, OF LOUISVILLE, KENTUCKY.

RAIL-ANCHOR.

1,184,477.   Specification of Letters Patent.   Patented May 23, 1916.

Application filed December 27, 1915. Serial No. 68,899.

*To all whom it may concern:*

Be it known that I, WILLIAM M. MITCHELL, a citizen of the United States, residing at Louisville, in the county of Jefferson and State of Kentucky, have invented certain new and useful Improvements in Rail-Anchors, of which I do declare the following to be a full, clear, and exact description, reference being had to the accompanying drawings, forming a part of this specification.

The present invention has for its object to provide a simple and efficient construction of rail anchor designed to prevent the longitudinal creeping of the rails of railway tracks.

The term rail anchor as used in this specification is intended to include not only the devices which have for their sole function the preventing of the longitudinal creeping of the rail but to include also tie plates or like devices to which my present invention is applicable.

The main object of the present invention is to provide an improved construction of rail anchor that can be readily applied to railway rails of different sizes, and the invention consists in the novel features of improvement hereinafter described, illustrated in the accompanying drawings and particularly pointed out in the claims at the end of this specification.

While I have set forth in this specification what I regard as the preferred embodiment of my invention, it will be readily understood by those familiar with this class of devices that extensive modifications may be made without departing from the spirit of the invention and that features of the invention may be employed without its adoption as an entirety.

In the various views of the drawings, A designates a railway rail of ordinary construction and provided with the usual base flanges $a$ and $a''$, and B denotes one of the ties of the railway track.

Figure 1:
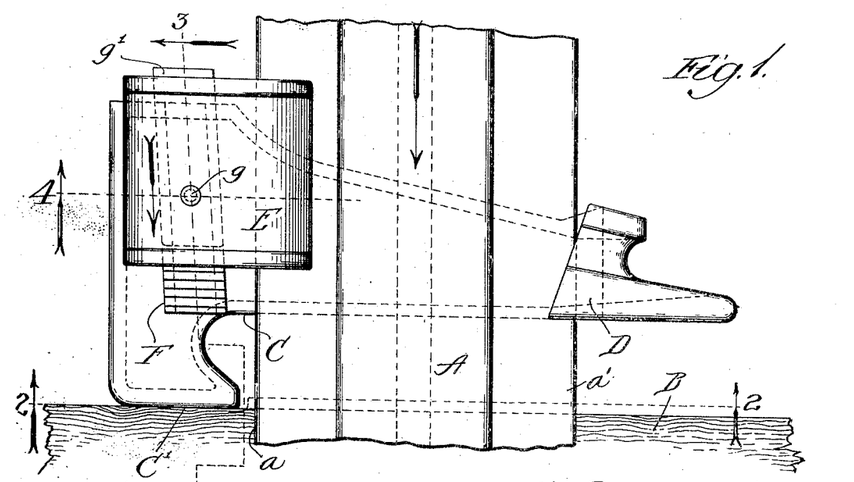
Figure 1 is a plan view of a portion of a railway rail having my invention applied thereto, a portion of one of the ties of the railway track being also shown.

In the form of the invention illustrated on Sheet 1, my improved rail anchor is shown as comprising a body member C adapted to extend beneath the base flanges of the rail A. One end of the member C is provided with a jaw D to engage the rail flange $a'$ and preferably this jaw D is formed integral with the member C. The opposite end of the member C is provided with a jaw E formed separate from the member C of the rail anchor and attached thereto in such manner that as the jaw E is forced into position to engage the flange $a$ of the rail A, the jaw will move toward the rail flange $a$ so that regardless of the exact size of the rail flanges $a$ and $a'$, the secure engagement of the jaws D and E with the flanges will be effected, when the jaw E is in position for use. Preferably, the movable jaw E is provided upon its under side with a groove adapted to receive an upstanding rib F at the end of the member C. As shown, this rib F is formed integral with the member C and upon the upper face thereof. By reference more particularly to Figs. 2 and 3, it will be seen that the rib F is a dovetail rib, that is to say, it has outwardly extending side portions $f$ with which engage the inwardly extending portions $e$ of the jaw E. In order to insure that the jaw E, when it is forced to position for use, shall move toward the flange $a$ of the rail, the rib F is inclined toward the rail A and as shown, also, the projecting portions $f$ of the rib F incline downwardly. Hence, it will be seen that as the jaw E is forced to position for use, the part of the jaw that is to grip the flange $a$ of the rail will move both downwardly and inwardly toward the flange until it engages said flange. In order to prevent any accidental withdrawal of the jaw E after it has been forced into engagement with the flange of the rail, suitable provision is made for guarding against the backward movement of this jaw E. In the form of my invention illustrated on Sheet 1 of the drawings, the rib F is shown as provided with a plurality of teeth $f^2$ adapted to be engaged by a pawl G that is suitably connected, as by rivets $g$, to the jaw E. The free end $g'$ of the pawl projects slightly beyond the end of the jaw E so that when it is desired to withdraw the jaw E from engagement with the rail flange, it is only necessary to lift up the free end of the pawl $g'$ to disengage it from the teeth $f^2$.

In applying to the railway rail A the improved construction of rail anchor shown on Sheet 1 of the drawings, the body member C will first be slipped beneath the rail and the jaw D will be engaged with one of the flanges $a'$ of the rail. The movable jaw E will then be engaged with the rib F and the jaw E will be moved in the direction of the arrow, Fig. 1, until the inner gripping surface of the jaw E engages the base $a$ of the rail. As the jaw E is thus moved along the rib F, the pawl G will ride over the teeth $f^2$ of the rib F and pawl G by its engagement with the teeth $f^2$ will securely guard against any backward movement of the jaw E. Inasmuch as the jaw E moves toward the rail A as the jaw is being forced to its position for use, it will be seen that my improved anchor is adapted to be used with different sizes of railway rails and this in practice will be found a very great advantage.

My invention is shown in the accompanying drawing as applied to that type of rail anchor in which the body member C is provided with an abutment or foot $C'$ adapted to bear against one side of the railway tie C, though it will be readily understood that my invention is susceptible of wider application.

Figure 2:
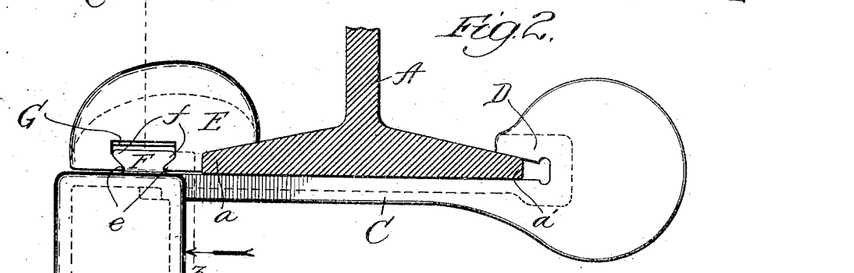
Fig. 2 is a view in cross section on line 2—2 of Fig. 1.
Figures 3, 4:
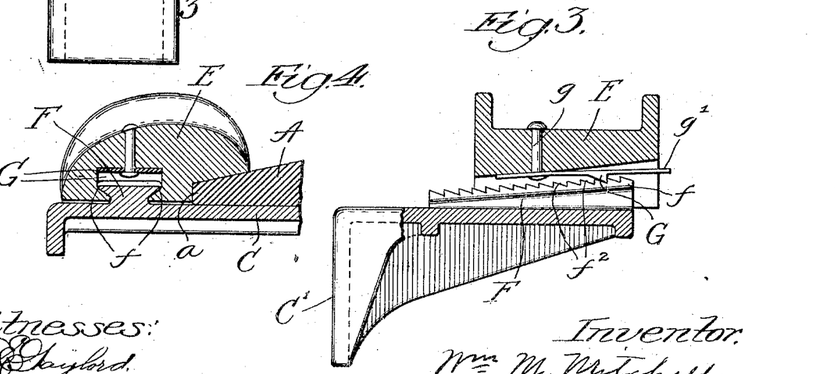
Fig. 3 is a view in vertical section on line 3—3 of Figs. 1 and 2.
Fig. 4 is a view in vertical cross section on the line 4—4 of Fig. 1.

When my improved rail anchor is in position for use as indicated in Figs. 1 and 2 of the drawings, any tendency of the rail A to travel in the direction of the arrow shown thereon will be resisted by the "shackle" action or "cramping" action of the rail anchor upon the flanges of the rail. So, also, it will be seen that any tendency of the rail A to creep in the direction of the arrow, Fig. 1, will tend to more tightly draw the jaw E against the flange $a$ of the rail.

Figure 5:
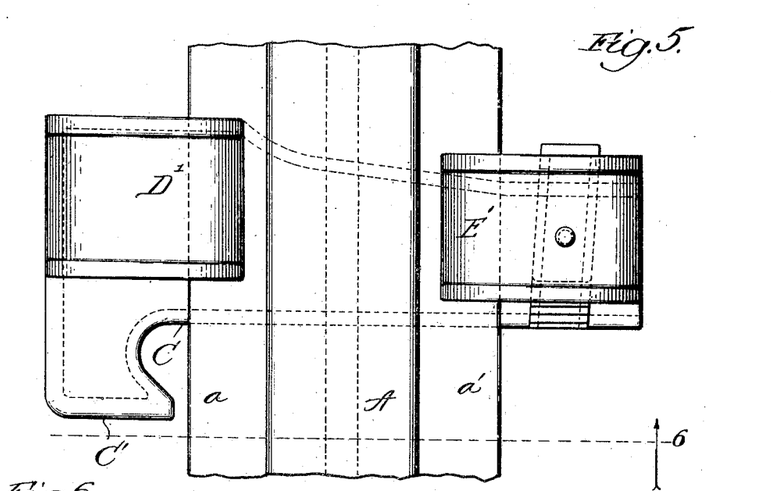
Fig. 5 is a view similar to Fig. 1 and showing a modified form of the invention.
Figure 6:
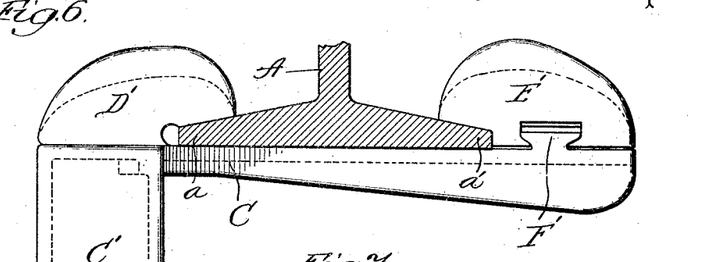
Fig. 6 is a view similar to Fig. 2 of the modification shown in Fig. 1.

In the form of my invention illustrated on Sheet 2 of the drawings, the body member C of the rail anchor is shown as having a movable jaw $E'$ at the end farthest removed from the foot or abutment $C'$ of the anchor. In this form of my invention, such end of the anchor is provided with a raised rib $F'$ corresponding to the raised rib F in the construction illustrated in Fig. 1 of the drawings and this rib $F'$ is engaged by the movable jaw $E'$ in the same manner as in the construction hereinbefore described. So, also, the movable jaw is shown as provided with a spring dog to engage teeth formed upon the rib $F'$, as in the construction above set forth. In this form of my invention, the opposite end of the body C is provided with a rigid jaw $D'$ to engage the base flange $a$ of the rail A. The jaws E, $E'$ and D, $D'$ hereinbefore described, may be formed as shown with projecting ribs, in order to give the desired strength thereto and similar strengthening ribs may also be formed along the body member C and its abutment or foot that engages the tie B.

Figure 7:
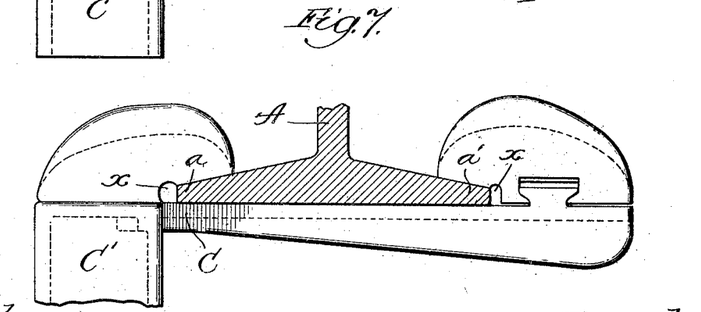
Fig. 7 is a view similar to Fig. 6 but showing a slightly modified form of the invention.

In the form of my invention illustrated on Sheet 1 and in the form illustrated in Figs. 5 and 6 of the drawings, the movable jaw is shown as engaging both the top and the edge of the rail base flange $a'$, while the fixed jaw of the anchor is shown as engaging the top of the rail base flange only. It is obvious that both the fixed and the movable jaws may engage both the top and edges of the rail base flanges or may engage either the top edges of the flanges. Thus, in Fig. 7 of the drawings, I have shown a construction similar to that illustrated in Figs. 5 and 6, but in this form, both the fixed and rigid jaws are provided with spaces or recesses $x$ to prevent the jaws contacting with the edges of the base flanges $a$ and $a'$ of the rail.

Instead of providing my improved rail anchor with only one movable jaw, both jaws of the anchor may be movable, as illustrated on Sheet 3 of the drawings. In this form of the invention, the body member C of the rail anchor is provided at the end adjacent the abutment $C'$ with a rib $F^2$ similar in construction to the ribs F and $F'$ hereinbefore described, and upon this rib $F^2$ is mounted one of the movable jaws $E^2$ that is provided with a slot to engage the rib $F^2$, as in the constructions hereinbefore set forth, a spring actuated pawl or detent G being provided to hold the jaw $E^2$ in position for use. At the opposite end of the body C a similar rib $F^3$ is formed, this rib being inclined in opposite direction to the rib $F^2$ at the other end of the rail anchor, and upon this rib $F^3$ is mounted a movable jaw $E^4$. The two movable jaws $E^3$ and $E^4$ will be placed upon the respective ribs $F^2$ and $F^3$ and will be moved in the direction of the arrow, Fig. 8, until the gripping portions of these jaws firmly engage the flanges $a$ and $a'$ of the rail A. When the jaws have thus engaged the rail, they will prevent any tendency of the rail to creep in the direction of the arrow, Fig. 8, under the stress of passing trains. When it is desired to release the rail anchor from engagement with the rail, it is only necessary to lift the pawls G until the pawls are disengaged from the teeth of the ribs $F^2$ and $F^3$.

In the form of the invention illustrated on Sheets 4 and 5 of the drawings, the rail anchor is in the form of a rail tie plate. That is to say, the body member $C^3$ rests upon the top of a cross tie B of the track and is connected therewith by spikes $b$, these spikes passing through suitable spike holes formed in the body member. In this form of the invention, I have shown the body member as comprising a fixed jaw and a movable jaw, although it is obvious that two movable jaws might be used in this construction, as in that illustrated on Sheet 3 of the drawings. The tie plate is shown as of rectangular form and as having the fixed jaw $D^5$ cast integral therewith, this jaw being of suitable construction to engage one of the flanges $a$ of the railway rail A.

Figure 11:
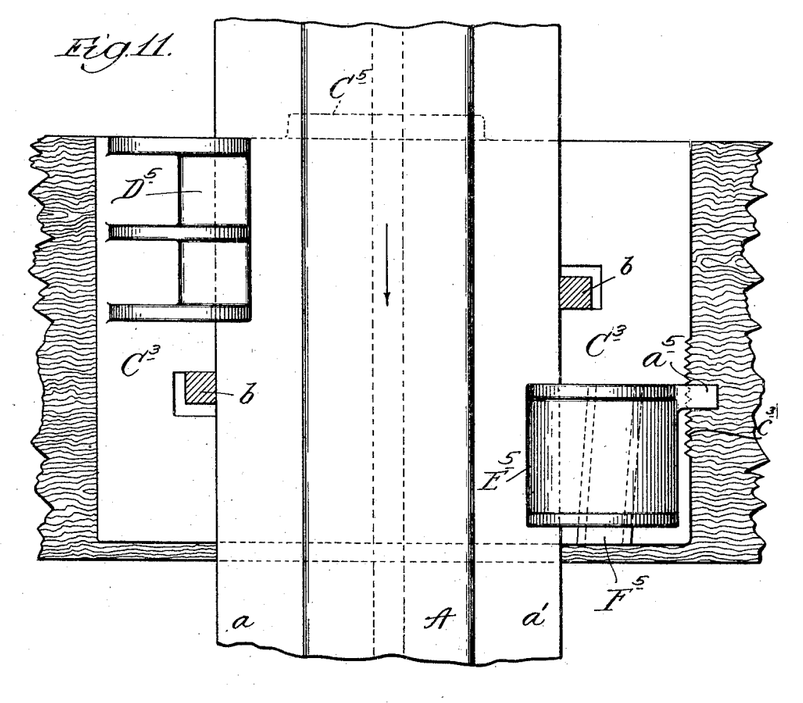
Fig. 11 is a plan view of a portion of a railway rail and a portion of a railway tie having mounted thereon a rail anchor tie plate embodying my invention.

Preferably, the body member $C^3$ is provided with an abutment $C^5$ adapted to bear against one side of the railway tie B. At the opposite side of the body member $C^3$ is formed a raised rib $F^5$ similar to the raised ribs hereinbefore described and similarly inclined inwardly toward the flange $a'$ of the railway rail A, the movable jaw $E^5$ being formed with a groove properly shaped to engage the rib $F^5$. As has been before stated, the movable jaws may be retained in position for use and against accidental displacement in various ways, and in Figs. 11 and 12 of the drawings, I have shown the jaw $E^5$ as having formed integral therewith a lug $A^5$ which, after the jaw $E^5$ has been forced into engagement with the flange $a'$ of the railway rail A, will be bent downwardly, as shown in Fig. 11, so as to engage with the notches $c^3$ formed at the edge of the body member $C^3$. From the foregoing description it will be seen that any tendency of the rail A to creep in the direction of the arrow, Fig. 11, will be resisted by the engagement of the jaws $D^5$ and $E^5$ and any tendency of the body member $C^3$ to move with the rail will be resisted by the abutment $C^5$, as well as by the spikes $b$. If it is desired to remove the movable jaw $E^5$, the bendable lug $a^5$ may be bent upward until it is disengaged from the notches $c^3$, after which the removable jaw E may be loosened by tapping the same with a hammer.

Figure 12:
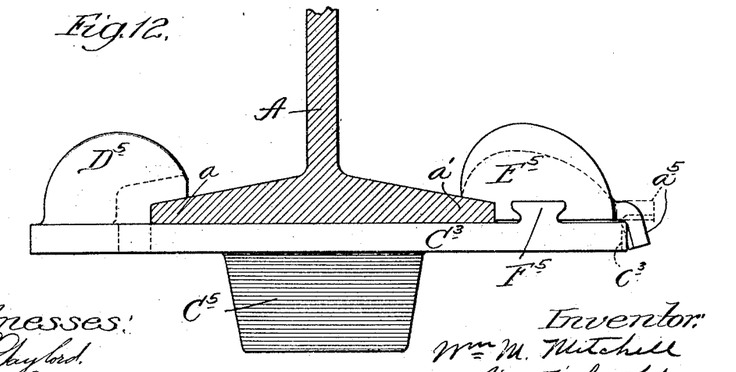
Fig. 12 is a view in front elevation of the structure shown in Fig. 11.
Figure 13:
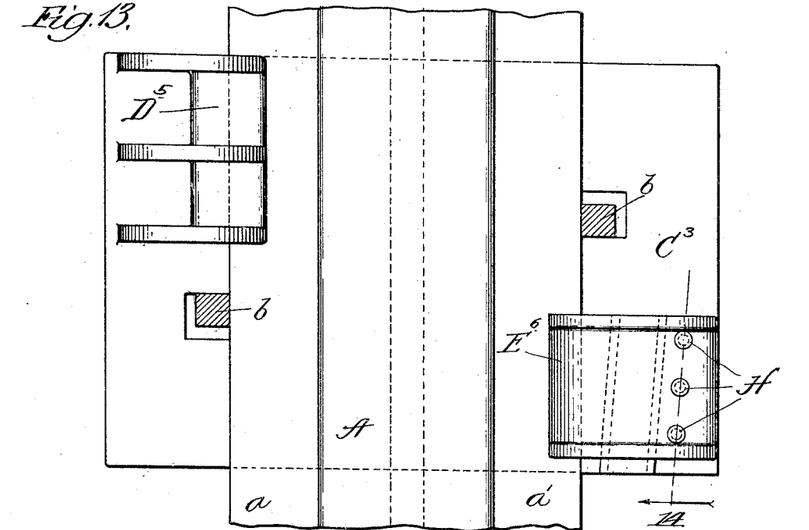
Fig. 13 is a view similar to Fig. 11 but showing modified means for holding the movable jaw of the device in locked position.
Figure 14:
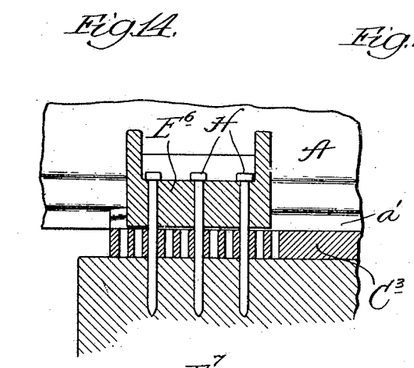
Fig. 14 is a view in vertical section on the line 14—14 of Fig. 13.

In the modification shown in Figs. 13 and 14 of the drawings, the construction is the same as that illustrated in Figs. 11 and 12, except that a somewhat different provision is made for holding the movable jaw $E^6$ against accidental displacement. In this form of the invention, the movable jaw $E^6$ is formed with one or more holes therethrough to receive the retaining pins H which pass through corresponding holes formed adjacent the edge of the body member.

Figure 15:
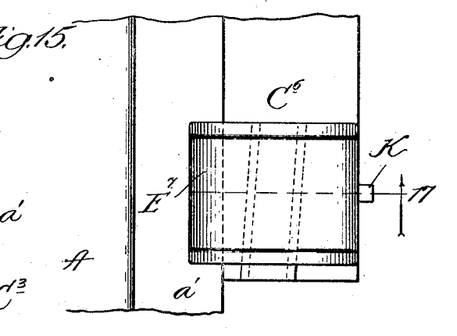
Fig. 15 is a plan view of a portion of a rail anchor tie plate embodying a modified form of the invention.
Figure 16:
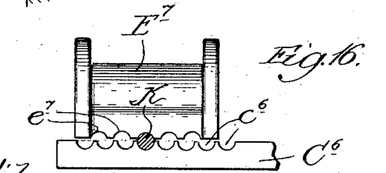
Fig. 16 is a view in side elevation of the modification illustrated in Fig. 15.
Figure 17:
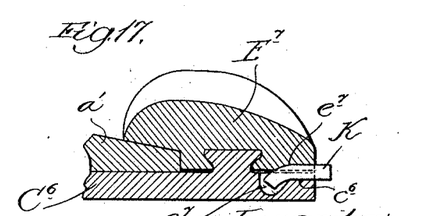
Fig. 17 is a sectional view on lines 17—17 of Fig. 15.

In Figs. 15, 16 and 17 of the drawings, there is illustrated another way in which the movable jaw $E^7$ may be retained against accidental movement. In this modification of the invention, the body portion $C^6$ will be similar to the body portion $C^3$ shown in Figs. 11 and 12, except that one edge of the body portion $C^6$ will be formed with a series of notches $c^6$ and the movable jaw $E^7$ will be correspondingly formed upon its under side and adjacent its outer edge with similar notches $e^7$. With this construction, when the movable jaw $E^7$ has been brought to position for use and in engagement with the flange $a'$ of the rail, a pin K will be driven into two of the coinciding notches (as for example the central notches shown in Fig. 16) and this pin will prevent the accidental withdrawal of the movable jaw $E^7$. Preferably, the inner ends of the notches $c^6$ will be depressed, as shown at $e^7$ in Fig. 17, so that the inner end of the pin K, when it has been completely driven in, will be clenched downward and hence prevented from accidental withdrawal.

The operation and advantages of the various forms of my invention will be readily understood by those familiar with this class of devices.

Figure 8:
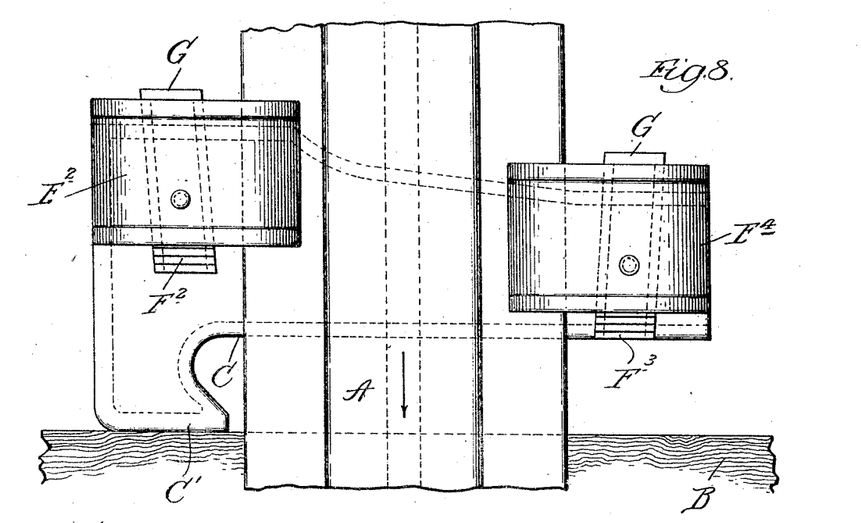
Fig. 8 is a view similar to Fig. 1 but showing a further modification of the invention.
Figures 9, 10:
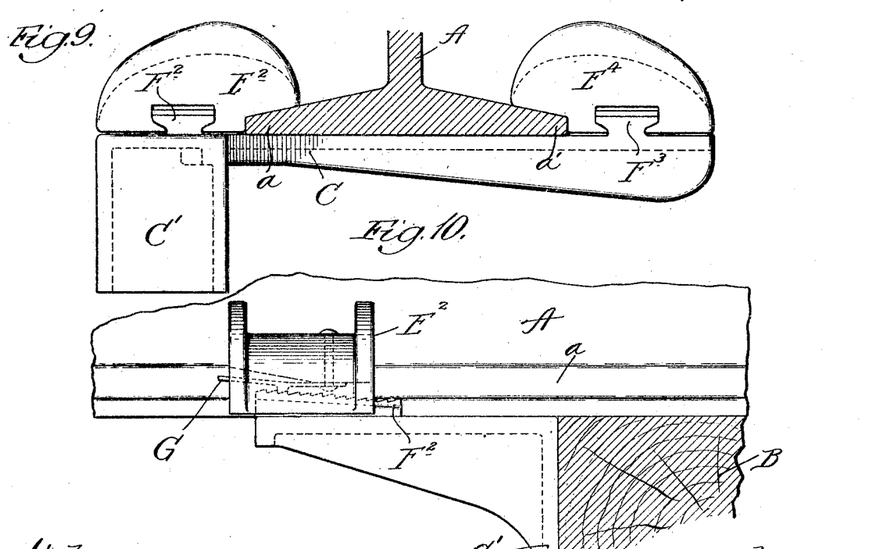
Fig. 9 is a view similar to Fig. 2 showing the construction illustrated in Fig. 8.
Fig. 10 is a view in side elevation of the construction shown in Figs. 8 and 9.
Figure 18:
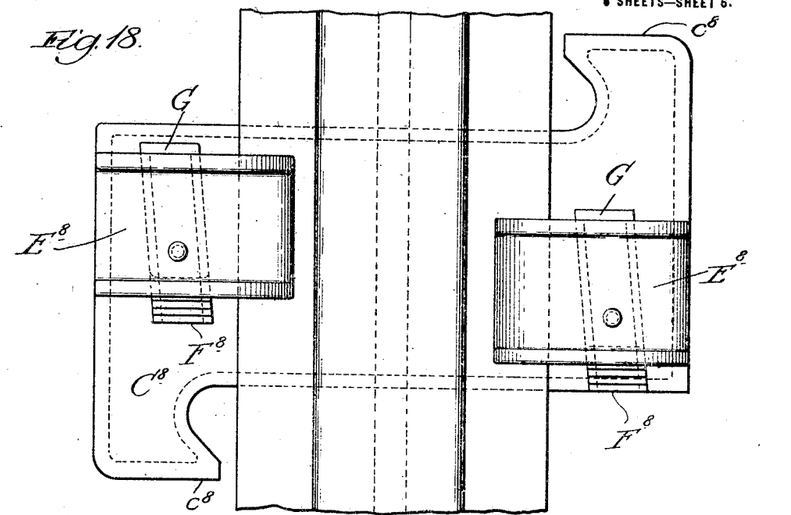
Fig. 18 is a plan view showing an anchor with abutments and with movable jaws at both ends.

In the form of the invention shown in Fig. 18, the body portion or member $C^8$ is shown as provided at its opposite ends with abutments $c^8$ similar to the abutment $C'$ in the construction shown in Figs. 8, 9 and 10 of the drawings. In this form of the invention, the tongues or ribs $F^8$ are similar to those shown on Sheet 3 of the drawings, except that those tongues or ribs are inclined in the same direction. The movable jaws $E^8$ are grooved similarly to the movable jaws shown on Sheet 3 to engage the tongues or ribs $F^8$ and spring pawls G are used to interlock the movable jaws with the teeth on the ribs $F^8$, as hereinbefore described. This form of anchor is especially desirable for use on railways where traffic occurs in both directions over the same rails; and it is obvious that as the rails creep in one direction, the abutment at the right-hand side of Fig. 18 will be forced against a tie and the creeping of the rail in such direction will tend to more tightly wedge the adjacent jaw $E^8$ against the base flange of the rail. On the other hand, if the rail tends to creep in the opposite direction, the abutment $c^8$ at the left-hand side of Fig. 18 will abut against a tie and the adjacent jaw $E^8$ will be more tightly wedged against the base flange of the rail. Where two movable jaws are employed, it is obvious that the anchors are better adapted for the wider variance in the sizes of rails.

Figure 19:
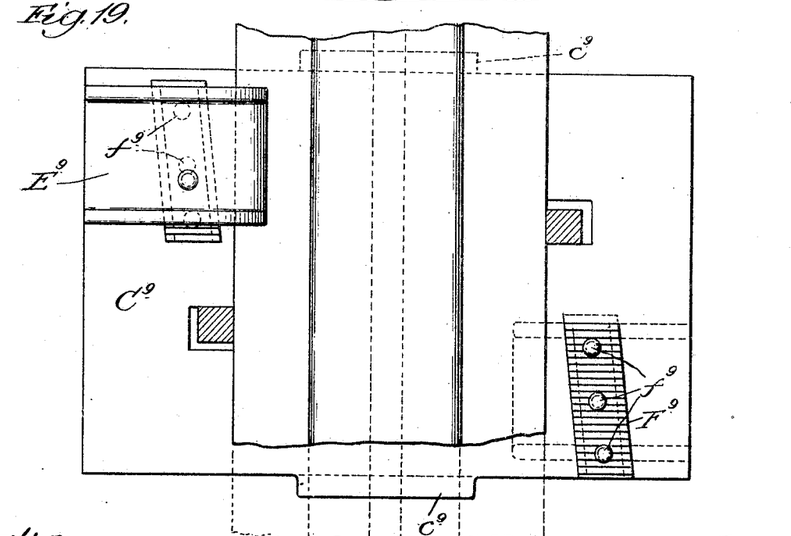
Fig. 19 is a view similar to Fig. 13 but showing two movable jaws and two depending tie abutments.

In the construction shown in Fig. 19, the body member $C^9$ is in the form of a tie plate that is provided at its opposite ends with downwardly depending feet or abutments $c^9$ similar to the abutment $C^5$ shown in Fig. 12, these abutments $c^9$ serving to resist any tendency of the plate or anchor to move in either direction with respect to the tie. In this form of the invention, the ribs or tongues $F^9$ are shown as formed separate from the body member $C^9$ and as connected thereto by rivets $f^9$. The construction of the movable jaws $E^9$ (one of which is shown by dotted lines in Fig. 19) is the same as that of the movable jaws hereinbefore described, these jaws being grooved to receive the ribs $F^9$. When the ribs $F^9$ are formed separate from and attached to the body member of the plate or anchor as in Fig. 19, my invention can be readily used in connection with various forms of tie plates of familiar construction, it being only necessary to drill holes in the tie plates to receive the rivets $f^9$ whereby the ribs $F^9$ are held in position upon the upper surface of the plate. When the ribs $F^9$ are thus formed separately, it will be a small matter to remove ordinary tie plates and apply my invention thereto.

Having thus described my invention, what I claim as new and desire to secure by Letters Patent is—

1. A rail anchor comprising a member adapted to extend beneath the base of a rail and jaws at the ends of said member for retaining said member on the base flanges of the rail, one of said jaws being movable transversely of said member and being provided upon its under side with a downwardly open groove, said member being provided beneath said movable jaw with a transverse rib raised above the surface of the portion of said member that bears against the base of the rail.

2. A rail anchor comprising a member adapted to extend beneath the base of a rail and jaws at the ends of said member for retaining said member on the base flanges of the rail, one of said jaws being movable transversely of said member and being provided upon its under side with a downwardly open groove, said member beneath said movable jaw having a rib raised above the rail base engaging face of said member, said member being extended outwardly beyond said rib to form a bearing for the outer portion of said movable jaw.

3. A rail anchor comprising a member adapted to extend beneath the base of a rail and jaws at the ends of said member for retaining said member on the base flanges of the rail, one of said jaws being movable transversely of said member and being provided upon its under side with a downwardly open groove, said member beneath said movable jaw having a raised rib to set within said groove and being extended outwardly beyond said rib to form a bearing for the outer portion of said movable jaw.

4. A rail anchor comprising a member adapted to extend beneath the base of a rail and jaws at the ends of said member for retaining said member on the base flanges of the rail, one of said jaws being movable transversely of said member, said movable jaw extending above and entirely at one side of the rail base engaging surface of said member, and being provided upon its under side with a groove, the part of said member beneath said movable jaw having a raised rib to enter said groove and being extended outwardly to form a bearing for the outer portion of said movable jaw.

5. A rail anchor comprising a member adapted to extend beneath the base of a rail and jaws at the ends of said member for retaining said member on the base flanges of the rail, one of said jaws being movable transversely of said member, said movable jaw extending above and entirely at one side of the rail base engaging surface of said member, and being provided upon its under side with a groove, the part of said member beneath said movable jaw having a raised rib to enter said jaw, said rib being inclined to cause said jaw to move toward the rail base as the jaw is forced to position for use.

6. A rail anchor comprising a member adapted to extend beneath the base of a rail and jaws at the ends of said member for retaining said member on the base flanges of the rail, one of said jaws being movable transversely of said member and being provided upon its under side with a downwardly open and upwardly expanded groove, said member being provided beneath said movable jaw with a transverse rib having an expanded head raised above the surface of the portion of said member that bears against the base of the rail.

7. A rail anchor comprising a member adapted to extend beneath the base of a rail and jaws at the ends of said member for retaining said member on the base flanges of the rail, one of said jaws being movable transversely of said member and being provided upon its under side with a downwardly open, dovetail groove, said member being provided beneath said movable jaw with a transverse dovetail rib raised above the surface of the portion of said member that bears against the base of the rail, said dovetail groove and rib being shaped to cause the movable jaw to move inwardly and downwardly toward the rail as said jaw is forced to position for use.

8. A rail anchor comprising a member adapted to extend beneath the base of a rail, said member being provided with a downwardly extending abutment to engage a tie and jaws at the opposite ends of said member for retaining said member on the base flanges of the rail, one of said jaws being movable transversely of said member and being provided upon its under side with a downwardly open groove, said member having its body portion arranged to bear against the base of the rail and being provided beneath said movable jaw with a transverse raised rib extending above the surface at that portion of said member that bears against the base of the rail.

9. A rail anchor comprising a member adapted to extend beneath the base of a rail, and jaws at the ends of said member for engaging the base flanges of the rail, said jaws being separably connected with and movable transversely of said member in a manner permitting said jaws to move toward the rail flanges as the jaws are forced to position for use.

10. A rail anchor comprising a member adapted to extend beneath the base of a rail and jaws at the ends of said member for engaging the base flanges of the rail, said jaws being movable transversely of said member, tongue and groove connections uniting said jaws with said member, said tongue and groove connection being inclined and arranged transversely of said member.

11. A rail anchor comprising a member adapted to extend beneath the base of a rail and jaws at the ends of said member for retaining said member on the base flanges of the rail, one of said jaws being movable transversely of said member and being provided upon its under side with a downwardly open groove, said member beneath said movable jaw having a raised rib to set within said groove, and a locking pawl interposed between said jaw and said raised rib for holding the jaw in position on the rib.

12. A rail anchor comprising a member adapted to extend beneath the base of a rail and jaws at the ends of said member for retaining said member on the base flanges of the rail, one of said jaws being movable transversely of said member, tongue and groove connections uniting said movable jaw to said member, and a pawl for holding said movable jaw in position for use.

WILLIAM M. MITCHELL.